United States Patent
Thomas et al.

(10) Patent No.: US 11,420,761 B2
(45) Date of Patent: Aug. 23, 2022

(54) AUTONOMOUS PROPELLER PROPULSION SYSTEM FOR AN AIRCRAFT, SAID AUTONOMOUS PROPELLER PROPULSION SYSTEM COMPRISING A FUEL CELL

(71) Applicants: Airbus SAS, Blagnac (FR); Airbus Operations SAS, Toulouse (FR); Airbus Operations GmbH, Hamburg (DE)

(72) Inventors: Matthieu Thomas, Toulouse (FR); Anthony Roux, Toulouse (FR); Didier Poirier, Blagnac (FR); Olivier Verseux, Toulouse (FR); André Anger, Hamburg (DE); Benedikt Bammer, Taufkirchen (DE); Guido Klewer, Hamburg (DE); Guillaume Gallant, Toulouse (FR); Florian Vogel, Taufkirchen (DE); Christian Wehle, Taufkirchen (DE)

(73) Assignees: AIRBUS SAS, Blagnac (FR); AIRBUS OPERATIONS SAS, Toulouse (FR); AIRBUS OPERATIONS GMBH, Hamburg (DE)

( * ) Notice: Subject to any disclaimer, the term of this patent is extended or adjusted under 35 U.S.C. 154(b) by 93 days.

(21) Appl. No.: 16/898,960

(22) Filed: Jun. 11, 2020

(65) Prior Publication Data
US 2021/0078719 A1 Mar. 18, 2021

(30) Foreign Application Priority Data
Jun. 14, 2019 (FR) ...................................... 1906399

(51) Int. Cl.
*B64D 35/02* (2006.01)
*B60L 50/71* (2019.01)
(Continued)

(52) U.S. Cl.
CPC .............. *B64D 35/02* (2013.01); *B60L 50/71* (2019.02); *B60L 58/30* (2019.02); *B64C 3/32* (2013.01);
(Continued)

(58) Field of Classification Search
CPC ........ B64D 27/24; B64D 29/02; B64D 33/08; B64D 35/02; B64D 37/02; B64D 2041/005
See application file for complete search history.

(56) References Cited

U.S. PATENT DOCUMENTS 5,402,968 A * 4/1995 Baldwin ................ B64D 37/02
244/135 R
2004/0028966 A1 2/2004 Hibbs et al.
(Continued)

FOREIGN PATENT DOCUMENTS

WO 2020003181 A1 1/2020

OTHER PUBLICATIONS

French Search Report; priority document.

*Primary Examiner* — Timothy D Collins
*Assistant Examiner* — Justin Michael Heston
(74) *Attorney, Agent, or Firm* — Greer, Burns & Crain, Ltd.

(57) ABSTRACT

An autonomous propeller propulsion system for an aircraft. The autonomous system comprises a chassis with first attachment systems which engage with second attachment systems of the wing to ensure detachable attachment of the autonomous system, a fuel cell attached to the chassis, an electric motor attached to the chassis and having an output shaft, a propshaft rotated by the output shaft, a propeller attached to the propshaft, a controller converting an electric current delivered by the fuel cells into an electric current delivered to the electric motor, a hydrogen feed duct and an
(Continued)

air feed duct, a set of auxiliary equipment, and a first connection arrangement, which connects with a second connection arrangement of the aircraft.

7 Claims, 3 Drawing Sheets

(51) Int. Cl.
| | |
|---|---|
| *B64C 5/06* | (2006.01) |
| *B64D 27/24* | (2006.01) |
| *B64D 29/02* | (2006.01) |
| *B64D 31/02* | (2006.01) |
| *B60L 58/30* | (2019.01) |
| *B64C 3/32* | (2006.01) |
| *B64D 33/10* | (2006.01) |
| *B64D 37/08* | (2006.01) |
| *B64D 41/00* | (2006.01) |

(52) U.S. Cl.
CPC ............... *B64C 5/06* (2013.01); *B64D 27/24* (2013.01); *B64D 29/02* (2013.01); *B64D 31/02* (2013.01); *B64D 33/10* (2013.01); *B64D 37/08* (2013.01); *B64D 41/00* (2013.01); *B60L 2200/10* (2013.01); *B64D 2041/005* (2013.01)

(56) References Cited

U.S. PATENT DOCUMENTS

| | | | |
|---|---|---|---|
| 2004/0118969 A1* | 6/2004 | MacCready | B64D 27/24 244/5 |
| 2016/0159492 A1* | 6/2016 | Filangi, Jr | B64D 13/06 244/58 |
| 2017/0327219 A1* | 11/2017 | Alber | H02S 20/00 |

* cited by examiner

AUTONOMOUS PROPELLER PROPULSION SYSTEM FOR AN AIRCRAFT, SAID AUTONOMOUS PROPELLER PROPULSION SYSTEM COMPRISING A FUEL CELL

CROSS-REFERENCES TO RELATED APPLICATIONS

This application claims the benefit of the French patent application No. 1906399 filed on Jun. 14, 2019, the entire disclosures of which are incorporated herein by way of reference.

FIELD OF THE INVENTION

The present invention relates to an autonomous propeller propulsion system for an aircraft, the autonomous propeller propulsion system comprising a fuel cell.

BACKGROUND OF THE INVENTION

In order to move, an aircraft comprises a propulsion system comprising an engine and a propeller. The engine generates a rotary movement that is transferred to the propeller.

The use of a heat engine is known for moving the propeller. Such a heat engine generally uses kerosene.

The intention is to find an alternative solution to the use of kerosene for propelling an aircraft. In particular, the inventors intend to use electric motors for propelling the aircraft.

A propulsion system therefore needs to be found that uses such electric motors, the features of which can be adapted to the requirements of the aircraft.

SUMMARY OF THE INVENTION

One aim of the present invention is to propose an autonomous propeller propulsion system comprising a fuel cell, the architecture of which allows it to be easily replaced by another autonomous propeller propulsion system with functional features that are similar or different depending on the requirements of the aircraft.

To this end, an autonomous propeller propulsion system is proposed for an aircraft comprising a wing with a structure with second attachment systems and a second connection means, the autonomous propeller propulsion system comprising:

a chassis with first attachment systems, which are intended to engage with the second attachment systems to ensure detachable attachment of the autonomous system on the structure;

at least one fuel cell attached to the chassis;

an electric motor attached to the chassis and having an output shaft;

a propshaft rotated by the output shaft;

a propeller attached to the propshaft;

a controller converting an electric current delivered by the fuel cells into an electric current delivered to the electric motor;

a hydrogen feed duct and an air intake duct that respectively route hydrogen and air to the fuel cells;

a set of auxiliary equipment enabling the operation of the fuel cells; and a first connection means linked with the controller and intended to be connected with the second connection means.

Such an autonomous system therefore can be easily disassembled and reassembled as a function of the requirements of the aircraft.

Advantageously, the autonomous system comprises, in parallel, a plurality of electric motors, each motor comprises an output shaft, and the autonomous system comprises a gearbox, which enables mechanical coupling between the output shafts and the propshaft rigidly connected to the propeller.

Advantageously, the autonomous system comprises an outer skin, at least one scoop on the outer skin and an exhaust pipe, and a cooling system with a heat exchanger, the heat exchanger is fed with fresh air from the at least one scoop, the heat exchanger expels hot air and the hot air is discharged through the exhaust pipe.

Advantageously, the autonomous system comprises a hydrogen tank attached to the chassis and hydraulically connected to the hydrogen feed duct.

According to a particular embodiment, the tank is cylindrical, the chassis comprises at least three rings press fitted and attached onto the tank, with a central ring, which supports a first part of the first attachment systems, a front ring, which is in front of the central ring and which supports a second part of the first attachment systems, a rear ring, which is behind the central ring, the chassis comprises a front structure, which is rigidly connected to the front ring and which extends in front of the tank and to which the electric motor with its output shaft, the propshaft and the propeller are attached, and the chassis comprises a rear structure, which is rigidly connected to the rear ring and which extends behind the tank.

Advantageously, the central ring and the front ring are disposed, relative to a longitudinal direction X of the autonomous propeller propulsion system, on either side of the center of gravity of the autonomous system.

According to another particular embodiment, the chassis corresponds to an engine nacelle comprising a set of structural frames, on which panels are attached, the chassis comprises a central part, in which a first one of the structural frames supports a first part of the first attachment systems and a second one of the structural frames supports a second part of the first attachment systems, the chassis comprises a front structure, which extends in front of the central part and to which at least the electric motor with its output shaft, the propshaft and the propeller are attached, and the chassis comprises a rear structure, which extends behind the central part.

Advantageously, the tank is cylindrical and is attached to the central part of the chassis.

More advantageously, the chassis comprises a door designed to allow the tank to be replaced.

According to another particular embodiment, the autonomous propulsion system comprises a fin in the tail section or near its tail section.

BRIEF DESCRIPTION OF THE DRAWINGS

The aforementioned features of the invention, as well as other features, will become more clearly apparent upon reading the following description of an embodiment, with the description being provided with reference to the accompanying drawings, in which.

DETAILED DESCRIPTION OF THE PREFERRED EMBODIMENTS

Figure 1:
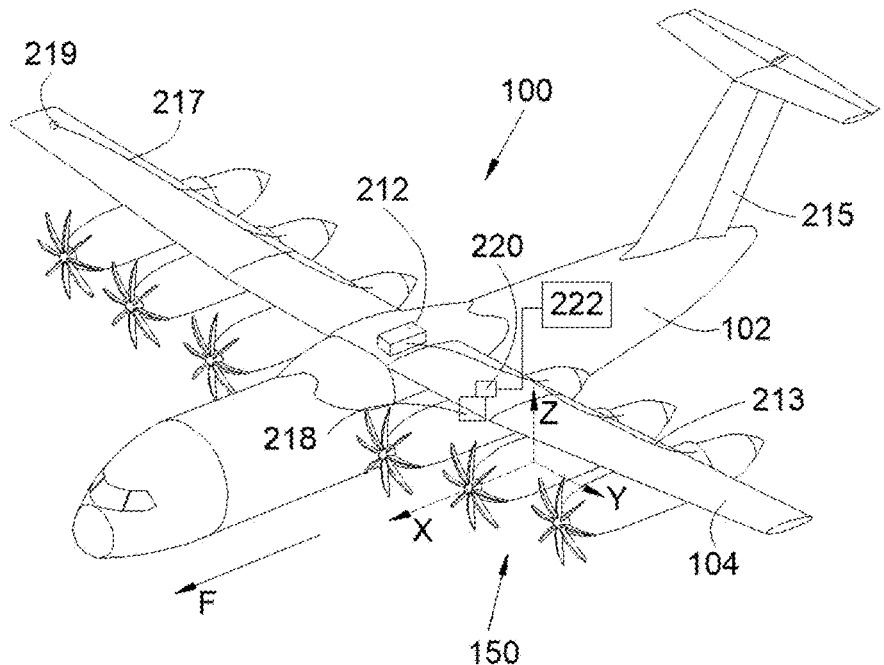
FIG. 1 is a perspective view of an aircraft comprising a plurality of autonomous propeller propulsion systems according to one embodiment of the invention.

Throughout the following description, the terms relating to a position are used with reference to an aircraft in the forward movement position, i.e., as shown in FIG. 1, where the arrow F shows the direction of forward movement of the aircraft.

FIG. 1 shows an aircraft 100, which has a fuselage 102, on either side of which a wing 104 is attached. At least one autonomous propeller propulsion system 150 is attached under each wing 104. In the embodiment of the invention shown in FIG. 1, there are three autonomous systems 150 per wing 104.

For each autonomous system 150, the wing 104 has an installation site, at which the autonomous system 150 is easily detachably attached when the aircraft stops over in an airport. In the embodiment of the invention shown in FIG. 1, the installation site is under the wing 104, but in another embodiment it can be above the wing 104. In general, each wing 104 comprises at least one installation site.

Throughout the following description, and by convention, X relates to the longitudinal direction of the autonomous system 150 positively oriented in the direction of forward movement of the aircraft 100, Y relates to the transverse direction of the autonomous system 150, which is horizontal when the aircraft is on the ground, and Z relates to the vertical direction or vertical height when the aircraft is on the ground, with these three directions X, Y and Z being orthogonal to each other.

To this end, the autonomous system 150 comprises a chassis (152, FIG. 3; 452, FIG. 4), which comprises first attachment systems and the wing 104 comprises a structure with second attachment systems, which engage with the first attachment systems to enable detachable attachment of the autonomous system 150 on the structure at an installation site. The autonomous system 150 comprises an outer skin, which is attached to the chassis 152, 452 and which forms an aerodynamic surface of the autonomous system 150.

Figure 2:
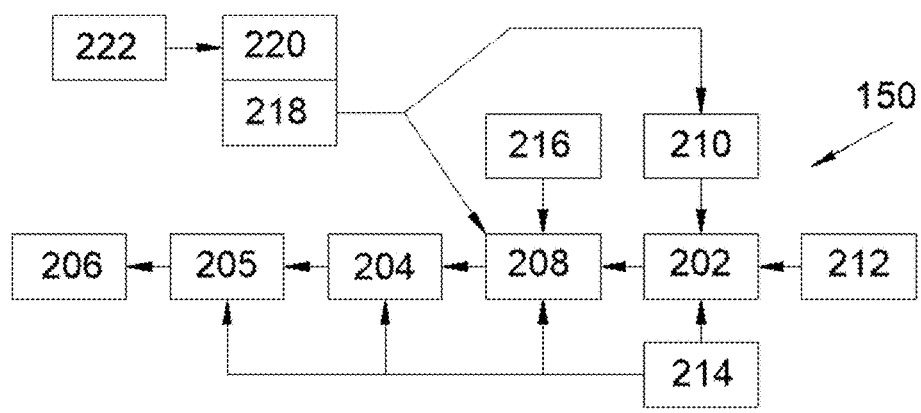
FIG. 2 is a schematic representation of an autonomous propeller propulsion system according to one embodiment of the invention.

FIG. 2 shows a schematic representation of an autonomous system 150, which comprises at least one fuel cell 202, an electric motor 204, which rotates a propshaft, and a propeller 206. The longitudinal direction X is the axis of rotation of the propeller.

The fuel cell 202 is a cell in which an electric voltage is generated by virtue of the oxidation of a reducing fuel on an electrode, in this case hydrogen, associated with the reduction of an oxidant on the other electrode, in this case the oxygen of the air. To this end, the autonomous system 150 comprises a hydrogen feed duct and an air feed duct, which respectively route hydrogen and air to the fuel cells 202.

The aircraft 100 also comprises at least one hydrogen tank 212.

The hydrogen feed duct is hydraulically connected to a hydrogen tank 212. The air feed duct is, for example, a scoop on the outer skin of the autonomous system 150.

The electric motor 204 and the fuel cells 202 are attached on the chassis 152 and the propeller 206 is attached on the propshaft, which is rotated by an output shaft of the electric motor.

The autonomous system 150 also comprises a controller 208, which particularly comprises an electric converter, which converts a direct electric current delivered by the fuel cells 202 into a direct or alternating electric current delivered to the electric motor 204. The conversion into the direct or alternating electric current depends on the type of electric motor that is used.

The autonomous system 150 also comprises a set of auxiliary equipment 210 (also known as "Balance of Plant"), which contains the equipment required to operate the fuel cells 202, such as, for example, the cooling circuits, as well as the hydrogen and compressed air feed, as well as the pumps, the compressors, the heat exchangers, the sensors and other equipment required to operate the circuits.

The autonomous system 150 also comprises a first connection means 218, which is connected with a second connection means 220 of the aircraft 100 when the autonomous system 150 is installed at its installation site. The second connection means 220 is linked with a system 222 for controlling the thrust of the aircraft 100. The thrust control system 222 particularly controls the thrust of each autonomous system 150.

The first and the second connection means are, for example, wireless transceivers, for example, Wi-Fi®, or electric connectors for a wired connection.

The second connection means 220 is arranged on the wing 104 at the installation site. These first 218 and second 220 connection means transfer commands and information between the system 222 for controlling the thrust of the aircraft 100, on the one hand, and the controller 208 and the auxiliary electrical equipment 210, on the other hand. This connection allows, among other things, the speed of rotation of the electric motor 204 to be controlled.

The first connection means 218 is linked with the controller 208 and the auxiliary electrical equipment 210.

Such an autonomous system 150 thus can be easily assembled on and disassembled from the structure of the wing 104 and thus can be replaced if necessary when the aircraft stops over in an airport. According to a first embodiment, this allows an autonomous system to be replaced with another autonomous system 150 in the event of a breakdown, while minimizing the impacts on the operations of the aircraft. According to a second embodiment, when the autonomous system comprises a hydrogen tank, this allows an autonomous system with an empty or partially empty hydrogen tank to be replaced with an autonomous system 150 with a hydrogen tank that is full enough to allow the next mission of the aircraft to be completed. This thus allows the aircraft to take off from the airport again without waiting for the empty or partially empty hydrogen tank to be filled, provided that it is quicker to replace the autonomous system than it is to fill the tank.

According to a first embodiment of the invention, the tank 212 is independent of the autonomous system 150 and is attached to the structure of the wing 104 or to a structure of a fuselage of the aircraft by detachable attachment means allowing the tank 212 to be replaced when it is empty, for example.

For more advanced integration, the autonomous system 150 can comprise the hydrogen tank 212, which is then rigidly connected to the chassis 152.

The autonomous system 150 can also comprise, in parallel, a plurality of electric motors 204 powered by the fuel cells 202, where each electric motor 204 comprises an output shaft. In this embodiment, the autonomous system 150 comprises a gearbox 205, which enables mechanical coupling between the output shafts of these electric motors 204 and the propshaft rigidly connected to the propeller 206.

In order to cool the various elements, the autonomous system 150 comprises a cooling system 214, which cools the fuel cells 202, the controller 208, the motors 204 and the gearbox 205.

The cooling system 214 comprises a heat exchanger, which is fed with fresh air from the outside through scoops on the outer skin. The fresh air heats up by passing through the heat exchanger, which then expels the hot air, which is discharged outside through an exhaust pipe behind the autonomous system 150.

The scoops can be distributed over the perimeter of the outer skin and they can be of the NACA type, for example, or can be of the type that is flush with the outer skin.

The exhaust pipe can have a variable section in order to regulate the flow of cooling air as a function of the requirements and of the temperature of the outside air.

The autonomous system 150 can also comprise batteries 216, which power the controller 208 if necessary, for example, when surplus power is demanded during takeoff, for example.

Figure 3:
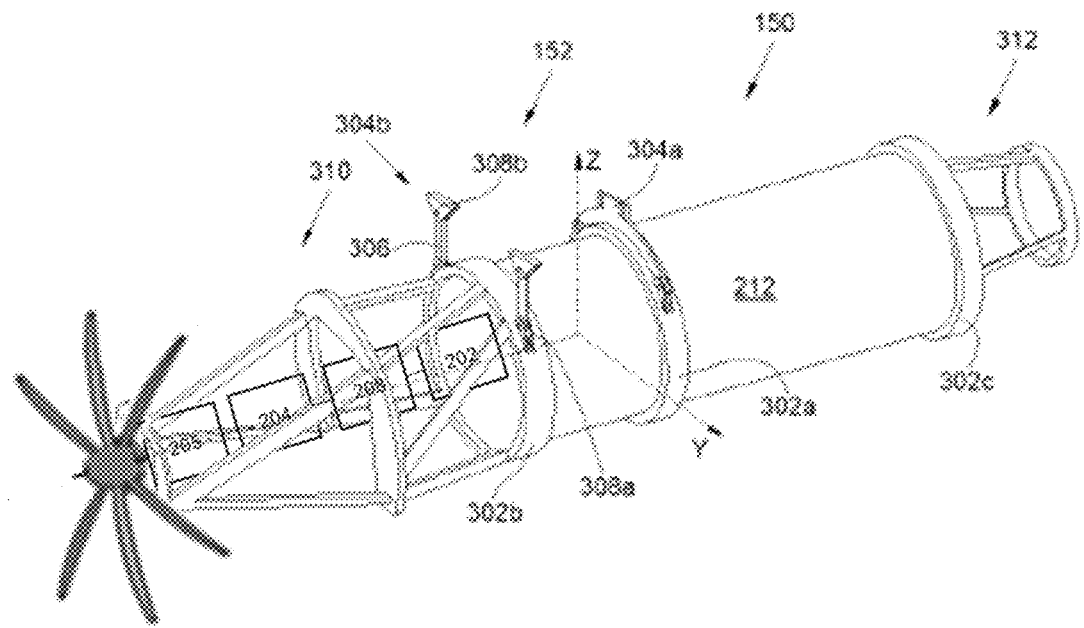
FIG. 3 is a perspective view of an autonomous propeller propulsion system according to a first particular embodiment.

FIG. 3 shows a first embodiment of the chassis 152 when the tank 212 is integrated in the autonomous system 150. The tank 212 is cylindrical, with its axis parallel to the longitudinal direction X.

The chassis 152 comprises at least three rings 302$a$-$c$, which are press fitted and attached onto the tank 212. The rings 302$a$-$c$ partly absorb the forces that are exerted on the tank 212 due to the pressure of the hydrogen.

The chassis 152 also supports the various elements forming the autonomous system 150 and it transfers the forces generated by these various elements and by the rotation of the propeller 206 to the structure of the wing 104.

The chassis 152 comprises a central ring 302$a$, which supports a first part 304$a$ of the first attachment systems, in this case a plate with bores for installing attachment bolts for attaching to the structure of the wing 104.

The chassis 152 comprises a front ring 302$b$, which is in front of the central ring 302$a$. The front ring 302$b$ supports a second part 304$b$ of the first attachment systems, in this case two connecting rods 306 pivotally mounted on either side of a central vertical plane of the tank 212 between a first clevis 308$a$ of the front ring 302$b$ and a second clevis 308$b$ of the structure of the wing 104.

The chassis 152 comprises a front structure 310, which is rigidly connected to the front ring 302$b$ and which extends in front of the tank 212. Some elements, including the electric motor 204 with its output shaft, the propshaft and the propeller 206 are attached to the front structure 310.

The front structure 310 in this case assumes the form of a cage produced by joists that are attached together and are attached to the front ring 302$b$.

The chassis 152 comprises a rear ring 302$c$, which is behind the central ring 302$a$.

The chassis 152 comprises a rear structure 312, which is rigidly connected to the rear ring 302$c$ and which extends behind the tank 212. The cooling system 214, in particular with the exhaust pipe, is attached to the rear structure 312.

The rear structure 312 in this case assumes the form of a cage produced by joists that are attached together and are attached to the rear ring 302$c$.

The other elements of the autonomous system 150 are attached onto at least one of the rings 302$a$-$c$, onto the front structure 310 or onto the rear structure 312.

In order to enable proper balancing of the autonomous system 150 when it is installed on the aircraft 100, the central ring 302$a$ and the front ring 302$b$ are disposed, relative to the longitudinal direction X, on either side of the center of gravity of the autonomous system 150.

In this embodiment, the tank 212 has a structural function, since it supports the other elements of the autonomous system 150 through the rings 302$a$-$c$.

Figure 4:
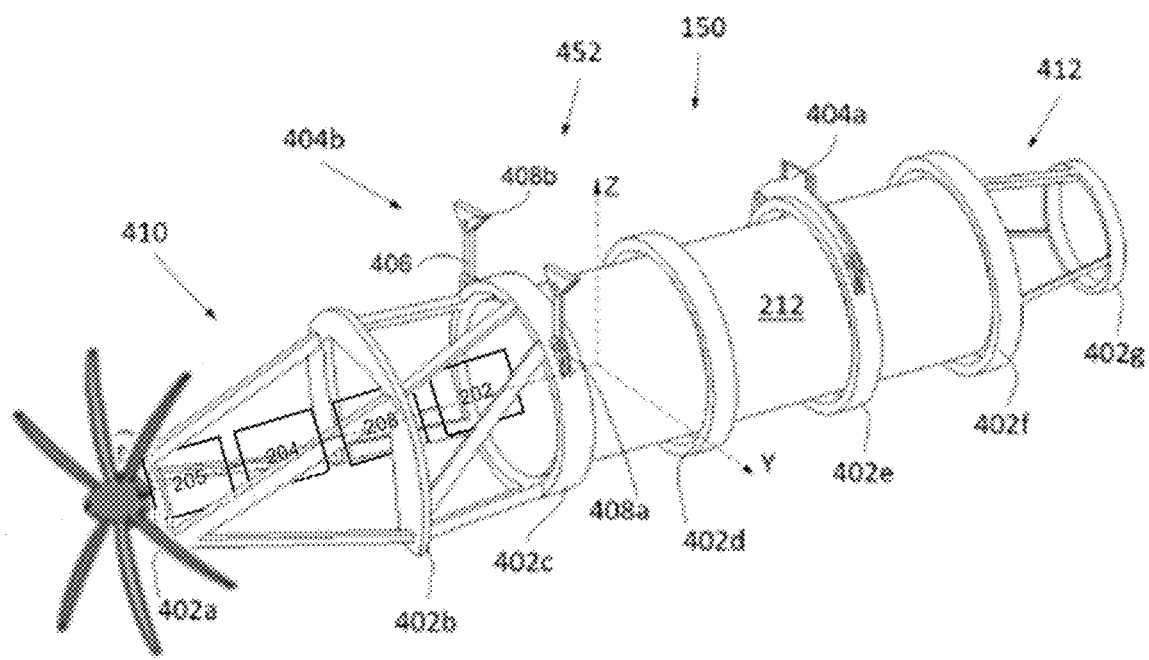
FIG. 4 is a perspective view of an autonomous propeller propulsion system according to a second particular embodiment.

FIG. 4 shows a second embodiment of the chassis. The chassis 452 corresponds to an engine nacelle comprising a set of structural frames 402$a$-$g$, on which panels are attached that form the outer skin of the autonomous system 150. The structural frames can be connected together by structural elements, not shown in the figure, such as, for example, stringers. The chassis comprises a central part, extending between the frames 402$c$ and 402$f$, in which a first structural frame 402$e$ supports a first part 404$a$ of the first attachment systems (in this case a plate with bores for installing attachment bolts for attaching to the structure of the wing 104) and a second structural frame 402$c$ supports a second part 404$b$ of the first attachment systems (in this case two connecting rods 406 pivotally mounted on either side of a central vertical plane of the autonomous system 150 between a first clevis 408$a$ of the frame 402$c$ and a second clevis 408$b$ of the structure of the wing 104). The chassis comprises a front structure 410, which extends in front of the central part and to which at least the electric motor with its output shaft, the propshaft and the propeller are attached. The front structure 410 in this case comprises the frames 402$a$-$c$. The chassis also comprises a rear structure 412, which extends behind the central part. The cooling system 214, with the exhaust pipe in particular, is attached to the rear structure 412. The rear structure 412 in this case comprises the frames 402$f$-$g$.

The other elements of the autonomous system 150 are attached onto at least one of the frames 402$a$-$g$.

Advantageously, in order to enable proper balancing of the autonomous system 150 when it is installed on the aircraft 100, the first structural frame 402$e$ supporting the first part 404$a$ of the first attachment systems and the second structural frame 402$c$ supporting the second part 404$b$ of the first attachment systems are disposed, relative to a longitudinal direction X of the autonomous propeller propulsion system 150, on either side of the center of gravity of the autonomous system 150.

The chassis 452 supports the various elements forming the autonomous system 150 and it transfers the forces generated by these various elements and by the rotation of the propeller 206 to the structure of the wing 104.

Advantageously, the tank 212 is integrated in the autonomous system 150.

In the example shown in the figure, the tank is cylindrical and is attached to the central part of the chassis. In this embodiment, the tank does not have a structural function other than that of withstanding the pressure of the hydrogen, since the support of the other elements of the autonomous system 150 is only implemented through the frames 402$a$-$g$.

More advantageously, the chassis comprises a door designed to allow the tank to be replaced. For the sake of clarity, the door is not shown in the figure.

This door can move between a closed position and an open position. In the closed position, the door is aligned with the rest of the outer skin. In the open position, the door leaves an opening free that allows through the tank 212 so that it can be replaced.

Figure 5:
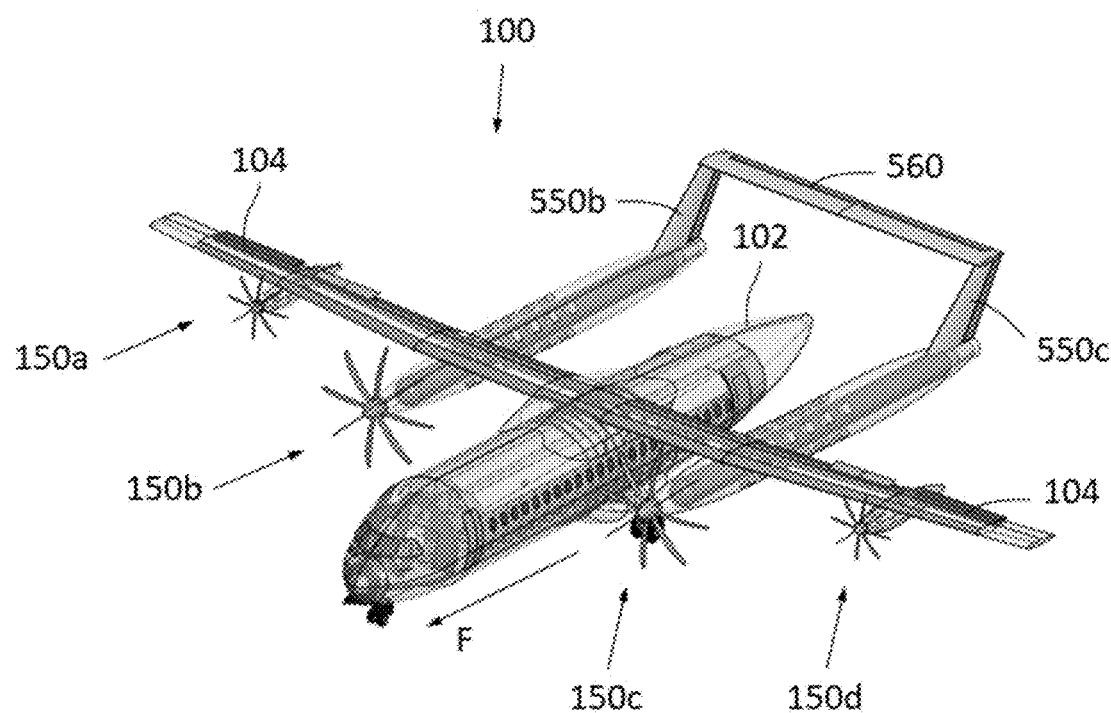
FIG. 5 is a perspective view of an aircraft comprising a plurality of autonomous propeller propulsion systems according to a particular embodiment of the invention.

FIG. 5, which is similar to FIG. 1, shows an aircraft 100 that has a fuselage 102, on either side of which a wing 104 is attached. At least one autonomous propeller propulsion system 150 is attached under each wing 104. In the embodiment of the invention shown in FIG. 5, there are two autonomous systems 150 per wing 104: two autonomous systems 105a-b are attached to the starboard side wing and two systems 150c-d are attached to the port side wing. Each of the autonomous systems 150b and 150c further comprises at least one fin 550b-c. Preferably, this fin is disposed in the tail section or near the tail section of the considered autonomous system. Such a fin then contributes to the aerodynamic stability of the aircraft. As shown in the example shown in the figure, the fuselage 102 of the aircraft thus may not comprise a tail fin. According to a first alternative shown in the figure, the fin 550b-c of an autonomous system 150b, 150c comprises a single aerodynamic surface that is disposed vertically when the aircraft is parked on the ground. According to other alternatives, this fin comprises a plurality of aerodynamic surfaces, for example, two aerodynamic surfaces disposed as a V-shape or four aerodynamic surfaces disposed as a cross. Preferably, the autonomous systems that comprise fins correspond to at least one pair of autonomous systems, with the two autonomous systems 150b, 150c of the same pair being symmetrically disposed on either side of a vertical central plane XZ of the fuselage 102 of the aircraft. Advantageously, a horizontal fin 560 can be attached to the two autonomous systems 150b, 150c of the same pair. In particular, the horizontal fin 560 is attached to fins 550b-c of the autonomous systems, as shown in the figure. In the embodiment shown in the figure, the aircraft comprises the autonomous systems 150b-c comprising fins, as well as autonomous systems 150a, 150d not comprising a fin. The various autonomous systems are symmetrically disposed on either side of the vertical central plane XZ of the fuselage 102 of the aircraft. In particular, the length of the autonomous systems 150b, 150c that comprise fins is longer than the length of the autonomous systems 150a, 150d that do not comprise a fin. This is advantageous, given that the aerodynamic efficiency of the fins 550b-c and/or 560 is even better since these fins are remote from the wings 104, behind them.

In each of the embodiments described above, i.e., when a tank 212 is on board each autonomous system 150, the aircraft 100 can comprise a filling circuit for filling each tank 212 from a tanker when the aircraft 100 is on the ground. To this end, the aircraft 100 comprises a fill hole 219 accessible from outside and fill pipes 217 hydraulically connected between the fill hole 219 and the tank 212 of each autonomous system 150. The fill pipes 217 in this case are in the wings 104 and the fill hole 219 in this case is at the end of the wing 104.

When the autonomous system 150 does not incorporate the tank 212, several tanks 212 can be integrated in the aircraft 100. The one or each tank 212 can be arranged in the wings 104 or in the fuselage 102 and the aircraft 100 comprises a feed line 213 hydraulically connected between a tank 212 and the hydrogen intake duct of each autonomous system 150.

The feed lines 213 in this case are disposed in the wings 104.

The use of such autonomous systems 150 allows the number and the power of the autonomous systems 150 to be adapted to the requirements of the aircraft 100 for taking a particular route, i.e., as a function of the distance to be covered and of the laden weight of the aircraft 100.

In order to take into account the autonomous systems 150 that are attached to the wings 104 for the route, the thrust control system 222 is programmable. The programming of the thrust control system 222 involves notifying the thrust control system 222, for each installation site of the wing 104, whether or not an autonomous system 150 is present at the installation site and which type of autonomous system 150 is present, i.e., the technical features of the present autonomous system 150.

The programming is completed manually by the pilot of the aircraft 100 using a keyboard, for example, or is completed automatically by acknowledging the presence or the absence of an autonomous system 150 at each installation site and by downloading its technical features from the autonomous system 150, for example, from a memory in the auxiliary electrical equipment 210.

The programming also can be carried out using pre-recorded scenarios, where each scenario corresponds to a particular configuration of the autonomous systems 150.

In the embodiment of the invention shown in FIG. 1, the aircraft 100 comprises a vertical tail fin 215, but in another embodiment the aircraft 100 does not comprise a vertical tail fin 215 and the trajectory of the aircraft 100 is then controlled through a differential control between the autonomous systems 150, which are on the port side, and the autonomous systems 150, which are on the starboard side, with such control being provided by the thrust control system 222.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An autonomous propeller propulsion system for an aircraft comprising a wing with a structure with second attachment systems and a second connection means, the autonomous propeller propulsion system comprising:
   a chassis with first attachment systems, which are configured to engage with the second attachment systems to ensure detachable attachment of the autonomous system on the structure;
   at least one fuel cell attached to the chassis;
   an electric motor attached to the chassis and having an output shaft;
   a propshaft rotated by said output shaft;
   a propeller attached to the propshaft;
   a controller converting an electric current delivered by the fuel cells into an electric current delivered to the electric motor;

a hydrogen feed duct and an air intake duct that respectively route hydrogen and air to the fuel cells;
a set of auxiliary equipment enabling an operation of the fuel cells; and
a first connection means linked with the controller and configured to be connected with the second connection means,
wherein said autonomous propeller propulsion system comprises a hydrogen tank attached to the chassis and hydraulically connected to the hydrogen feed duct,
wherein the tank is cylindrical,
wherein the chassis comprises at least three rings press fitted and attached onto the tank, with a central ring, which supports a first part of the first attachment systems, a front ring, which is in front of the central ring and which supports a second part of the first attachment systems, a rear ring, which is behind the central ring,
wherein the chassis comprises a front structure, which is rigidly connected to the front ring and which extends in front of the tank and to which the electric motor with its output shaft, the propshaft and the propeller are attached, and
wherein the chassis comprises a rear structure, which is rigidly connected to the rear ring and which extends behind the tank.

2. The autonomous propeller propulsion system according to claim 1,
wherein said autonomous propeller propulsion system comprises, in parallel, a plurality of electric motors,
wherein each motor comprises an output shaft, and
wherein the autonomous propeller propulsion system comprises a gearbox which enables mechanical coupling between the output shafts and the propshaft rigidly connected to the propeller.

3. The autonomous propeller propulsion system according to claim 1, wherein the central ring and the front ring are disposed, relative to a longitudinal direction of the autonomous propeller propulsion system, on either side of a center of gravity of the autonomous system.

4. An autonomous propeller propulsion system for an aircraft comprising a wing with a structure with second attachment systems and a second connection means, the autonomous propeller propulsion system comprising:

a chassis with first attachment systems, which are configured to engage with the second attachment systems to ensure detachable attachment of the autonomous system on the structure;
at least one fuel cell attached to the chassis;
an electric motor attached to the chassis and having an output shaft;
a propshaft rotated by said output shaft;
a propeller attached to the propshaft;
a controller converting an electric current delivered by the fuel cells into an electric current delivered to the electric motor;
a hydrogen feed duct and an air intake duct that respectively route hydrogen and air to the fuel cells;
a set of auxiliary equipment enabling an operation of the fuel cells; and
a first connection means linked with the controller and configured to be connected with the second connection means,
wherein the chassis corresponds to an engine nacelle comprising a set of structural frames, the chassis comprises:
a central part, in which a first one of said structural frames supports a first part of the first attachment systems and a second one of said structural frames supports a second part of the first attachment systems,
a front structure, which extends in front of the central part and to which at least the electric motor with the output shaft, the propshaft and the propeller are attached, and
a rear structure, which extends behind the central part.

5. The autonomous propeller propulsion system according to claim 4, wherein said autonomous propeller propulsion system comprises a hydrogen tank attached to the chassis and hydraulically connected to the hydrogen feed duct.

6. The autonomous propeller propulsion system according to claim 5, wherein the tank is cylindrical and is attached to the central part of the chassis.

7. The autonomous propeller propulsion system according to claim 1, further comprising a fin.

* * * * *